US008602050B2

(12) United States Patent
Jiang

(10) Patent No.: US 8,602,050 B2
(45) Date of Patent: Dec. 10, 2013

(54) SELF-CLEANING VARNISH SUPPLY MACHINE

(75) Inventor: Chuanbin Jiang, Guangzhou (CN)

(73) Assignee: Avery Dennison Corporation, Mentor, OH (US)

( * ) Notice: Subject to any disclaimer, the term of this patent is extended or adjusted under 35 U.S.C. 154(b) by 384 days.

(21) Appl. No.: 12/861,949

(22) Filed: Aug. 24, 2010

(65) Prior Publication Data

US 2012/0052208 A1 Mar. 1, 2012

(51) Int. Cl.
*F16K 3/36* (2006.01)

(52) U.S. Cl.
USPC ........... 137/238; 137/240; 137/266; 137/312; 137/565.18; 137/870; 118/203

(58) Field of Classification Search
USPC ........... 137/15.01, 15.05, 238, 240, 266, 312, 137/565.01, 565.16, 565.18, 628, 861, 870; 127/352; 222/148; 118/302, 117, 203
See application file for complete search history.

(56) References Cited

U.S. PATENT DOCUMENTS

| | | | | |
|---|---|---|---|---|
| 2,371,188 | A * | 3/1945 | Russell | 137/207.5 |
| 3,981,320 | A * | 9/1976 | Wiggins | 137/240 |
| 4,369,734 | A * | 1/1983 | Preuss | 118/702 |
| 4,380,308 | A * | 4/1983 | Greenwood | 222/148 |
| 4,403,736 | A * | 9/1983 | Scharfenberger | 239/112 |
| 4,556,011 | A * | 12/1985 | Tarr | 118/46 |
| 5,289,947 | A * | 3/1994 | Akeel et al. | 222/108 |
| 6,037,010 | A * | 3/2000 | Kahmann et al. | 427/426 |
| 6,834,679 | B2 * | 12/2004 | Briggs | 137/899.4 |
| 2005/0028867 | A1 * | 2/2005 | Ciarelli et al. | 137/240 |
| 2006/0102650 | A1 * | 5/2006 | Albrecht et al. | 222/1 |

* cited by examiner

*Primary Examiner* — Craig Schneider
*Assistant Examiner* — Jessica Cahill

(57) ABSTRACT

A self-cleaning varnish supply machine and method of using the same. The machine has a plurality of at least two cylindrical storage containers, a supply line, a return line, a pump, a compressed air supply source, a plurality of at least two outlet valves, a plurality of two inlet valves, and a compressed air supply source valve. The machine can be operated in three different modes. In the first mode, the machine can be used to supply varnish to a varnish application device. Next, the machine can be operated in an automated self-cleaning mode. Finally, the machine can be operated in a manual self-cleaning mode.

7 Claims, 11 Drawing Sheets

SELF-CLEANING VARNISH SUPPLY MACHINE

FIELD OF THE INVENTION

A machine for supplying varnish and method of using the same. More particularly, the invention relates to a self-cleaning varnish supply machine and methods of operating the machine in a supply mode, an automated self-cleaning mode, and a manual self-cleaning mode.

BACKGROUND OF THE INVENTION

The use of varnish in the retail apparel ticketing industry is well known. Varnish is typically applied to apparel tickets to give apparel tickets a glossy finish, thus enhancing the appearance of the tickets. Additionally, the application of varnish to apparel tickets protects any underlying image that may be printed on the tickets.

Human workers may apply varnish to apparel tickets manually; however, more commonly, the application of varnish is accomplished using an automated process that utilizes machines. Varnish application can be accomplished using brushers, rollers, sprayers, or any other suitable method.

Current methods of supplying varnish to the machines that apply the varnish to the apparel tickets are unsatisfactory. The current methods of varnish supply allow the varnish solvent to quickly evaporate, thereby dramatically altering the viscosity of the varnish as the varnish thickens with the evaporation of the solvent. This is problematic, as it causes pumps used during the varnish application and supply process to become plugged, thus necessitating frequent maintenance and leading to prolonged downtimes. Furthermore, the thickened varnish affects the application of the varnish to the apparel tickets, and may negatively affect the quality of the desired final product. Furthermore, the current methods of varnish supply do not allow for a quick changeover between different varnish types. Therefore, whenever it is desired to apply a different type of varnish, the machines used in the varnish application and supply process must be manually cleaned, again leading to significant downtimes.

Therefore, what is needed is an improved machine for supplying varnish and an improved method for using such an improved machine.

BRIEF SUMMARY OF THE INVENTION

By proving an improved self-cleaning varnish supply machine and a method of using the machine, the present invention overcomes the problems of prior varnish supply methods identified above.

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The present invention relates to a self-cleaning varnish supply machine. The machine has a proximal end, a distal end, a near side, and a far side. The machine has a storage container receptacle mounted to a frame. A plurality of at least two cylindrical storage containers are disposed within the storage container receptacle. A pump is located at the distal end of the machine. A supply line runs along the far side of the machine and runs from the proximal end to the distal end of the machine. The pump is connected to the supply line at the distal end of the machine. A return line runs along the near side of the machine from the proximal end to the distal end of the machine. The pump is connected to the return line at the distal end of the machine. A plurality of at least two outlet valves connect the plurality of at least two storage containers to the supply line. A plurality of at least two inlet valves connect the plurality of at least two storage containers to the return line. A first compressed air supply is located at the proximal end of the machine. The first compressed air supply is connected to the supply line at the proximal end of the machine by a first compressed air supply valve. The machine has a control mechanism for controlling the plurality of at least two outlet valves, the plurality of at least two inlet valves, and the first compressed air supply valve. The machine further has a user interface for controlling the self-cleaning varnish supply machine.

The present invention also relates to a method of supplying varnish using a self-cleaning varnish supply machine. The method begins with the step of providing a self-cleaning varnish supply machine having a plurality of at least two cylindrical storage containers, a supply line, a return line, a pump, a compressed air supply, a plurality of at least two outlet valves, a plurality of at least two inlet valves and a compressed air supply valve. Next, the method includes the step of filling the first storage container with varnish and the second storage container with water. Then, the first outlet valve and the first inlet valve on the first storage container are simultaneously opened. The method concludes by activating the pump.

Additionally, the present invention also relates to a method of automatically cleaning a self-cleaning varnish supply machine. The method begins with the step of providing a self-cleaning varnish supply machine having a plurality of at least two cylindrical storage containers, a supply line, a return line, a pump, a compressed air supply, a plurality of at least two outlet valves, a plurality of two inlet valves, and a compressed air supply valve. Next, the method includes the step of filling the first storage container with varnish and the second storage container with water. The first outlet valve on the first storage container is then closed, and the compressed air supply valve on the compressed air supply is opened. Then, simultaneously, the first inlet valve on the first storage container and the compressed air supply valve are closed after the compressed air supply valve has been opened for a predetermined period of time. Next, the second outlet valve and the second inlet valve on the second storage container are simultaneously opened. The second outlet valve is then closed after the second outlet valve has been opened for a predetermined period of time. Then, the compressed air supply valve is opened. The method concludes by simultaneously closing the second inlet valve and the compressed air supply valve, and deactivating the pump after the compressed air supply valve has been opened for a predetermined period of time.

Finally, the present invention relates to a method of manually cleaning a self-cleaning varnish supply machine. The method begins with the step of providing a self-cleaning varnish supply machine having a plurality of at least two cylindrical storage containers, a supply line, a return line, a pump, a compressed air supply, a plurality of at least two outlet valves, a plurality of at least two inlet valves, and a compressed air supply valve. Then, the method includes the step of filling the first storage container with varnish and the second storage container with water. Next, the second outlet valve and the second inlet valve on the second storage container are simultaneously opened, and the pump is activated. The second outlet valve is closed after the second outlet valve has been opened for a predetermined period of time. Then, the compressed air supply valve is opened. The method concludes by simultaneously closing the second inlet valve and the compressed air supply valve and deactivating the pump after the compressed air supply valve has been opened for a predetermined period of time.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

Figure 1:
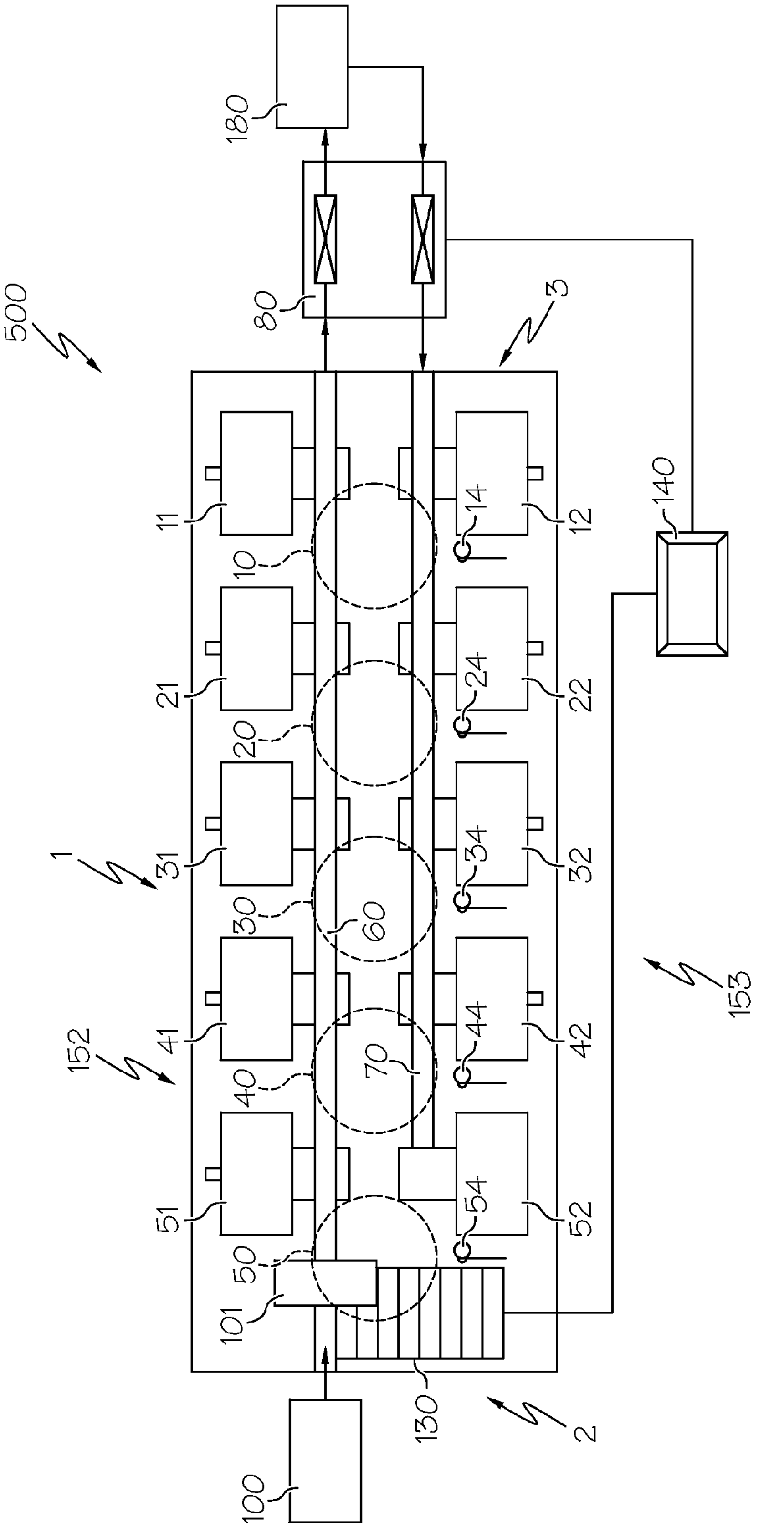
FIG. 1 is a top view of an exemplary embodiment of the present invention.
Figure 2:
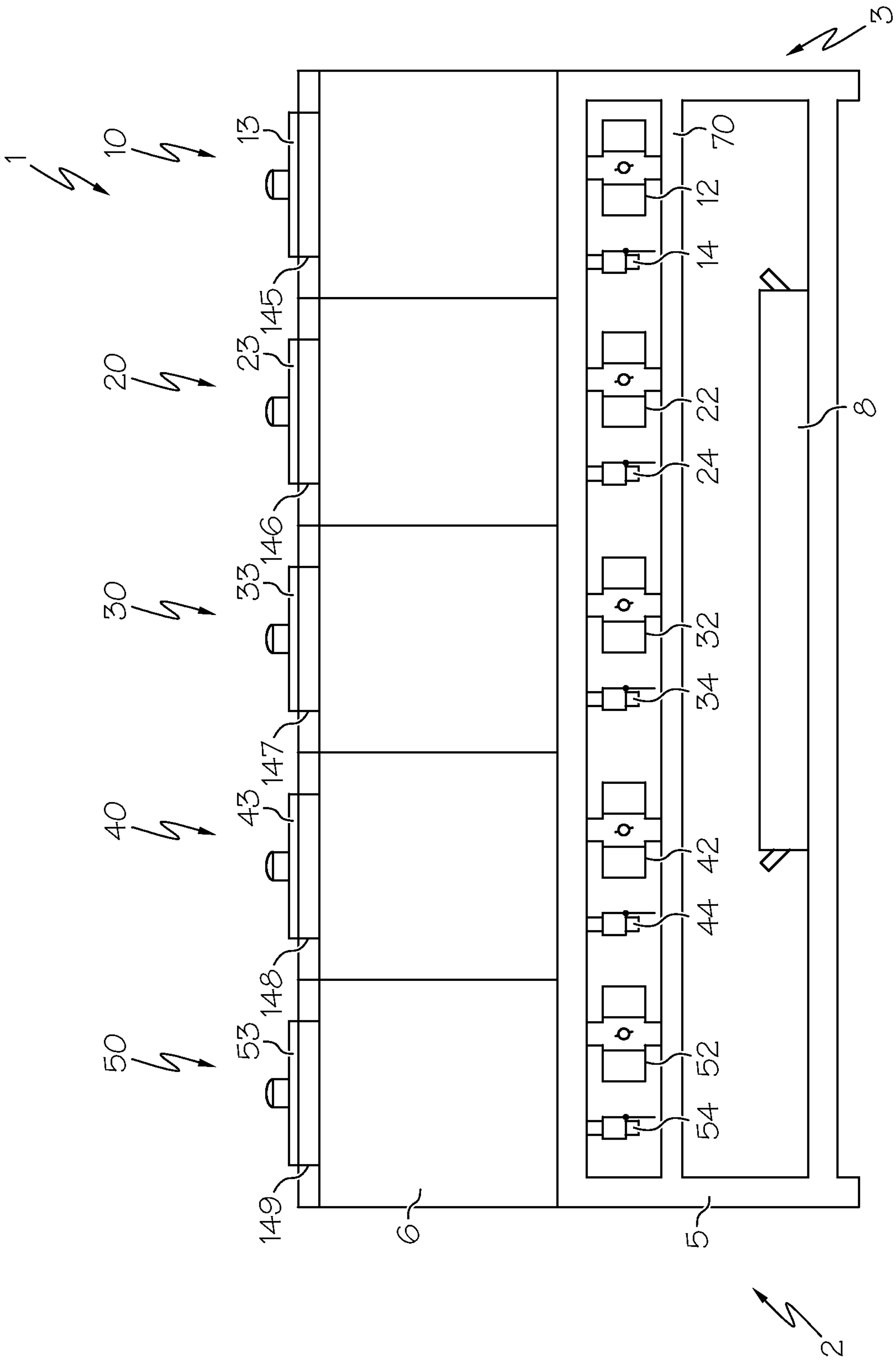
FIG. 2 is a side view of the exemplary embodiment of the present invention shown in FIG. 1.
Figure 3:
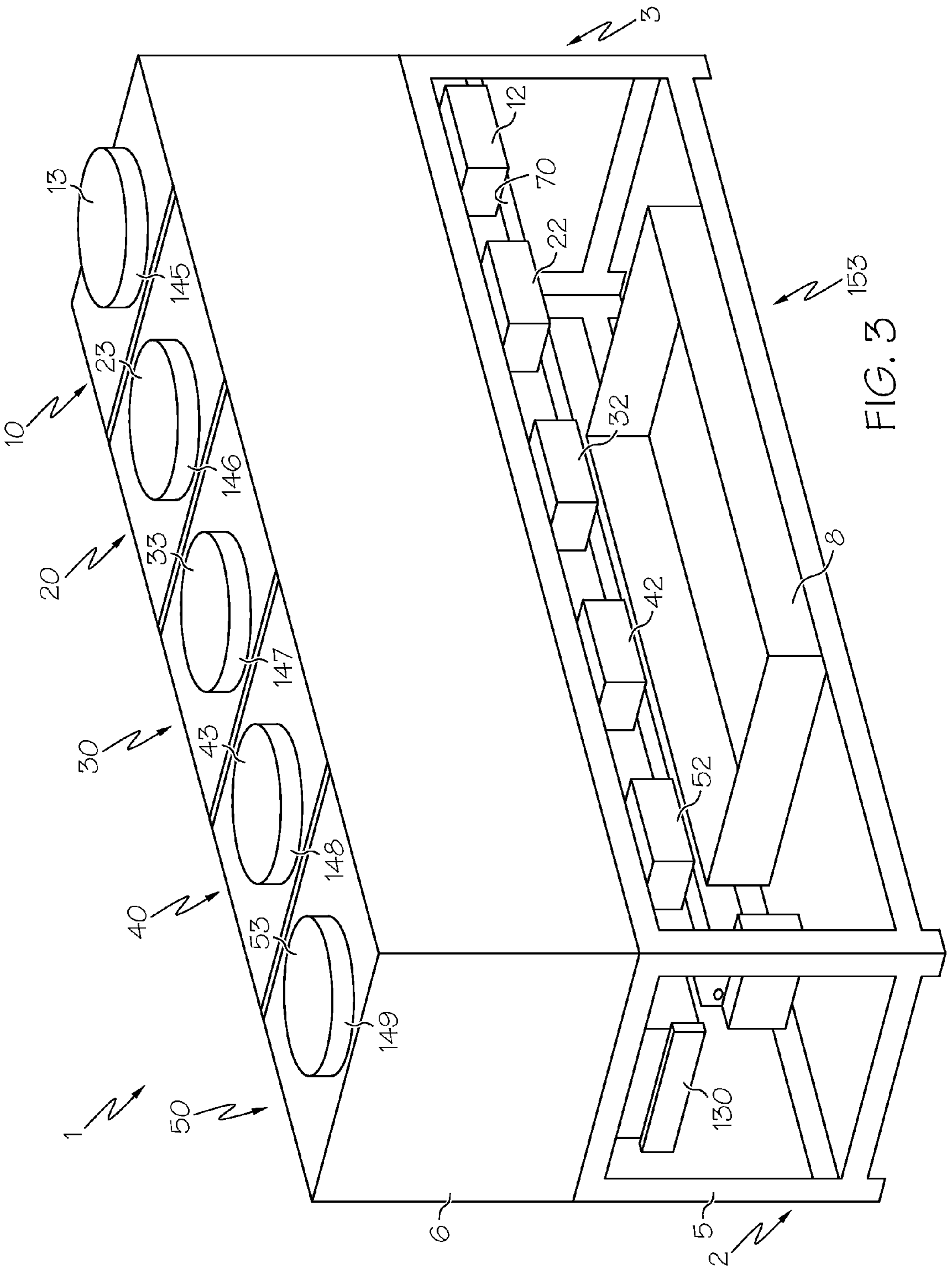
FIG. 3 is a perspective view of the exemplary embodiment of the present invention shown in FIG. 1.

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such.

Referring now to FIG. 1 through 4, an exemplary embodiment of a self-cleaning varnish supply machine 1 is shown. The machine 1 supplies varnish to a varnish application device 180. Together, the machine 1 and the varnish application device 180 constitute a varnishing system 500.

The machine 1 has a proximal end 2, a distal end 3, a far side 152, and a near side 153. It should be noted that portions of the machine 1 not pertinent to the present invention are neither shown nor described in detail herein. The machine 1 has a frame 5 that supports a storage container receptacle 6. A plurality of five cylindrical voids 145, 146, 147, 148, 149 extend from the top to substantially the bottom of the storage container receptacle 6. The cylindrical voids 145, 146, 147, 148, 149 are positioned inline with one another from the proximal end 2 to the distal end 3 of the machine 1, and are equally spaced apart from one another.

The machine 1 further has a plurality of five cylindrical storage containers 10, 20, 30, 40, 50. The storage containers 10, 20, 30, 40, 50 are respectively disposed within, and retained by, the cylindrical voids 145, 146, 147, 148, 149. The outer diameter of the storage containers 10, 20, 30, 40, 50 closely approximates, but is not exactly equal to, the inner diameter of the cylindrical voids 145, 146, 147, 148, 149. The storage containers 10, 20, 30, 40, 50 are respectively provided with a plurality of five cylindrical storage container lids 13, 23, 33, 43, 53.

A supply line 60 and a return line 70 run parallel to the cylindrical voids 145, 146, 147, 148, 149 and are positioned under the storage container receptacle 6. The supply line 60 and the return line 70 extend from the proximal end 2 of the machine 1 to the distal end 3. As can most clearly be seen in FIG. 1, the supply line 60 is positioned toward the far side 152 of the machine 1, while the return line 70 is positioned toward the near side 153. A plurality of five outlet valves 11, 21, 31, 41, 51 establish a connection between the storage containers 10, 20, 30, 40, 50 and the supply line 60, while a plurality of five inlet valves 12, 22, 32, 42, 52 establish a connection between the storage containers 10, 20, 30, 40, 50 and the return line 70. A plurality of five manual valves 14, 24, 34, 44, 54 are positioned toward the near side 153 of the machine 1 and extend downwardly from the bottom of the storage container receptacle 6. The plurality of five manual valves 14, 24, 34, 44, 54 run parallel to the return line 70.

Each one of the plurality of five storage containers 10, 20, 30, 40, 50 is provided with one of the plurality of five outlet valves 11, 21, 31, 41, 51, one of the plurality of five inlet valves 12, 22, 32, 42, 52, and one of the plurality of five manual valves 14, 24, 34, 44, 54. Accordingly, the first container 10 is paired with the first outlet valve 11, the first inlet valve 12, and the first manual valve 14 The second container 20 is paired with the second outlet valve 21, the second inlet valve 22, and the second manual valve 24. The third container 30 is paired with the third outlet valve 31, the third inlet valve 32, and the third manual valve 33 The fourth container 40 is paired with the fourth outlet valve 41, the fourth inlet valve 42 and the fourth manual valve 44. The fifth container 50 is paired with the fifth outlet valve 51, the fifth inlet valve 52, and the fifth manual valve 54.

A first compressed air supply 100 is located at the proximal end 2 of the machine 1. The first compressed air supply 100 is connected to the supply line 60 via a first compressed air supply valve 101. A liquid circulation pump 80 is located at the distal end 3 of the machine 1 and is connected to both the supply line 60 and the return line 70. A varnish application device 180 is connected to the machine 1 via the pump 80.

A user interface 140 allows an operator to control the machine 1. The user interface 140 is connected to the pump 80 and a valve control mechanism 130. The control mechanism 130 receives the input entered into the user interface 140 and actuates the various valves of the machine 1 to supply varnish and to execute the self-cleaning process. The control mechanism 130 includes eleven solenoid valves (not shown). The solenoid valves of the control mechanism 130 control the action of the five outlet valves 11, 21, 31, 41, 51, the five inlet valves 12, 22, 32, 42, 52, and the compressed air supply valve 101. While the control mechanism 130 of the present invention is composed of eleven solenoid valves, it is contemplated that any series of mechanisms and/or electronics may be employed to control the action of the various valves within the machine 1.

Figure 4:
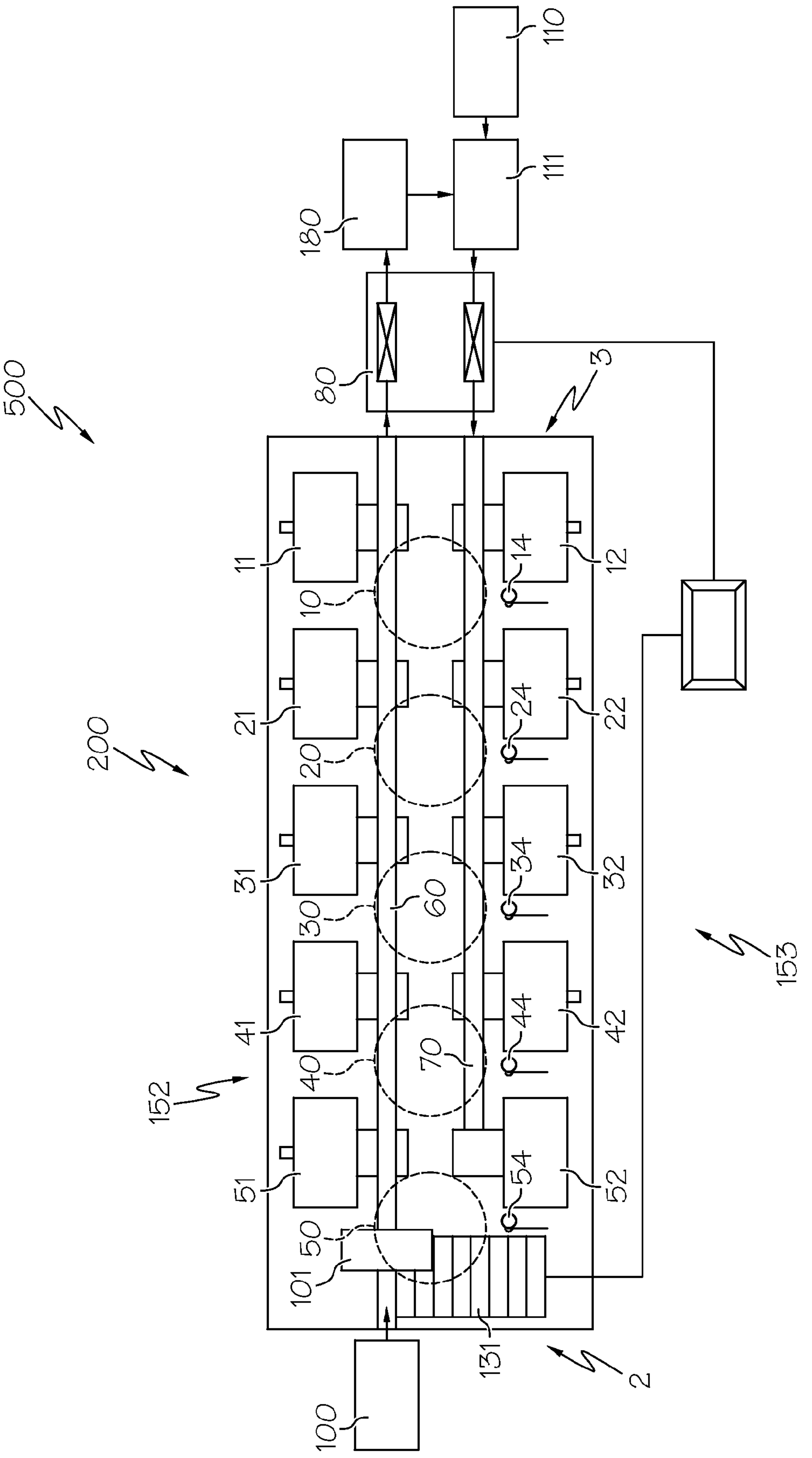
FIG. 4 is a top view of an alternative embodiment of the present invention.

Referring now to FIG. 4, a first alternative embodiment of a self-cleaning varnish supply machine 200 is shown. The first alternative embodiment of the self-cleaning varnish supply machine 200 is identical to that of the exemplary embodiment of the self-cleaning varnish supply machine 1 shown in FIG. 1 through 3 except for the addition of a second compressed air supply 110 located at the distal end 3 of the machine 200. The second compressed air supply 110 is connected to the return line 70 via a second compressed air supply valve 111. Additionally, a modified control mechanism 131, similar to the control mechanism 130 of the exemplary embodiment of the self-cleaning varnish supply machine 1, is provided. The modified control mechanism 131 is different from the control mechanism 130 of the exemplary embodiment of the machine 1 in that the modified control mechanism 131 is altered to include twelve solenoid valves (not shown); the additional solenoid valve being used to control the action of the second air supply valve 111.

The operation of the exemplary embodiment of the self-cleaning varnish supply machine 1 will now be explained. It should be noted that operations of the machine 1 not pertinent to the present invention are not described in detail herein.

Referring now back to FIGS. 1 through 4, before the machine 1 can be operated, the operator of the machine 1 must ensure that the storage containers 10, 20, 30, 40, 50 are filled with the appropriate liquid and that the level of the liquid in each of the storage containers 10, 20, 30, 40, 50 is adequate. To check the levels of the liquid in each of the storage containers 10, 20, 30, 40, 50, the operator must remove the storage container lids 13, 23, 33, 43, 53 and visually inspect the level of the liquid within each of the storage containers 10, 20, 30, 40, 50. The lids 13, 23, 33, 43, 53 prevent contaminants from entering into the liquids contained within the storage containers 10, 20, 30, 40, 50 and furthermore reduce the rate of evaporation of the liquids.

It is contemplated that the machine 1 could be equipped with sensors that monitor the liquid level contained within each of the storage containers 10, 20, 30, 40, 50 to avoid the requirement of having the operator remove the lids 13, 23, 33, 43, 53 to visually inspect the liquid level. The information provided by such sensors could be displayed on the user interface 140 to allow the operator to assess the status of the liquid levels within the machine 1.

In the case of the various embodiments of the machine 1, 200, shown in FIGS. 1 through 6B, the first, second, third, and fourth storage containers 10, 20, 30, 40 are filled with different types of varnishes, while the fifth storage container 50 is filled with water. However, it is contemplated that instead of filling four of the storage containers 10, 20, 30, 40 with varnish and the fifth storage container 50 with water, the machine 1, 200 could be configured such that more than one of the storage containers 10, 20, 30, 40, 50 are filled with water. Such modification would allow the machine 1, 200 to complete more than one self-cleaning cycle (described below) before having to replenish the machine 1, 200 with fresh water.

With regard to the water contained by the fifth storage container 50, the operator must not only ensure that the water level is adequate, but also that both the water and the fifth storage container 50 are clean. If the water is contaminated, the operator must drain and clean the fifth storage container 50 before refilling the fifth storage container 50 with fresh water. The contaminated water can be drained from the fifth storage container 50 using the fifth manual valve 54. Opening the fifth manual valve 54 allows the contents of the fifth storage container 50 to drain into the discharge basin 8 located beneath the storage container receptacle 6. The discharge basin 8 can then be evacuated using a pump or other appropriate means. However, it is contemplated that a drain line or pump may be directly attached to the fifth manual valve 54, thereby bypassing the step of draining the contents of the fifth storage container 50 into the discharge basin 8.

The other four manual valves 14, 24, 34, 44 on the first, second, third, and fourth storage containers 10, 20, 30, 40 serve a similar purpose. If the operator wishes to replace the contents of one of the four storage containers 10, 20, 30, 40 with a different type of varnish or different type of liquid altogether, the operator must first drain the appropriate storage container using the appropriate manual valve. Accordingly, if the operator wished to replace the contents of the third storage container 30, the operator would begin by opening the third manual valve 34, thereby allowing the contents of the third storage container 30 to drain into the discharge basin 8. The operator would then have to clean the third storage container 30 before refilling it with a different type of varnish to prevent any contamination between varnish types. Once cleaned, the operator would then close the third manual valve 34 and fill the third storage container 30 with the desired type of varnish. Replacing the contents of any of the five storage containers 10, 20, 30, 40, 50 would be accomplished in a like manner.

The machine 1 can be directed to supply varnish once the operator has ensured that the storage containers 10, 20, 30, 40, 50 are filled with the appropriate liquid and that the level of the liquid in each of the storage containers 10, 20, 30, 40, 50 is adequate. For the purposes of this disclosure, it will be assumed that the first storage container 10 is filled with "Type A" varnish, the second storage container 20 is filled with "Type B" varnish, the third storage container 30 is filled with "Type C" varnish, and the fourth storage container 40 is filled with "Type D" varnish.

Figure 5:
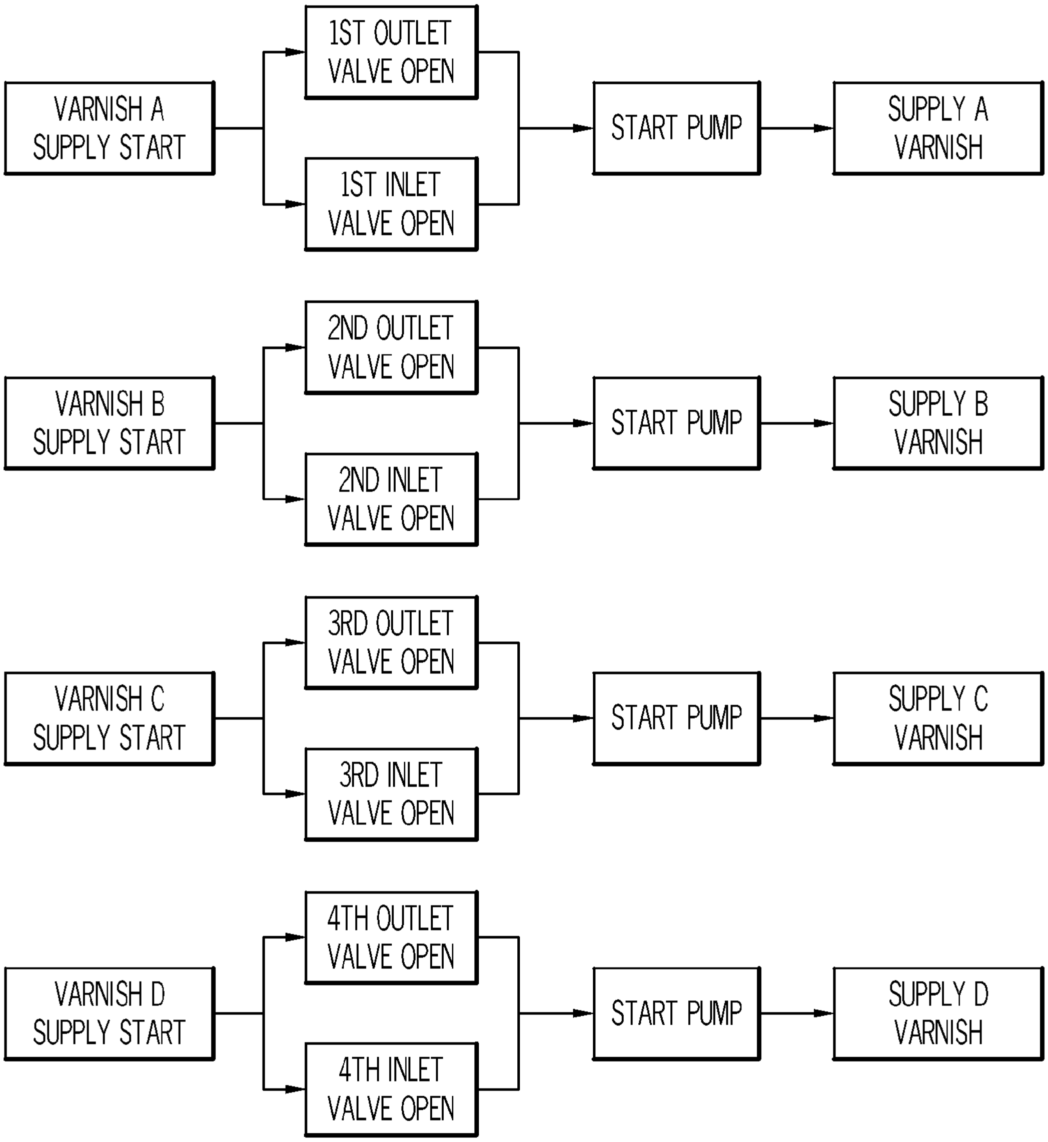
FIG. 5 is a control flow chart depicting the use of the exemplary embodiment of the present invention shown in FIG. 1 and the alternative embodiment of the present invention shown in FIG. 4 to supply varnish.

Referring now to FIGS. 1 and 5, with particular attention being directed to the control flow chart shown in FIG. 5, in order to supply Type A varnish, the operator depresses the corresponding Type A varnish button on the user interface 140. The user interface 140 relays this input to the control mechanism 130. The control mechanism 130 simultaneously opens the first outlet valve 11 and the first inlet valve 12. The pump 80 is activated two seconds after the first outlet valve 11 and the first inlet valve 12 are simultaneously opened. This causes Type A varnish to drawn out of the first outlet valve 11 and through the supply line 60 towards the pump 80. The Type A varnish flows through the pump 80 and is supplied to the varnish application device 180. Any excess Type A varnish not used by the varnish application device 180 is drawn away from the varnish application device 180 by the pump 80 and is recirculated back into the machine 1 through the return line 70. The type A varnish travels through the return line 70 and is directed back into the first storage container 10 by the first inlet valve 12.

As can be seen in the control flow chart shown in FIG. 5, the above process is executed in a similar fashion in regards to the supply of other varnish types. However, different valves will be actuated depending on what type of varnish is desired by the operator. Accordingly, if Type B varnish is desired, the control mechanism will open the second outlet valve 21 and the second inlet valve 22. If type C varnish is desired, the control mechanism will open the third outlet valve 31 and the third inlet valve 32. If type D varnish is desired, the control mechanism will open the fourth outlet valve 41 and the fourth inlet valve 42. It should be noted that the machine 1 will not directly switch between the supply of one type of varnish to another. Rather, to avoid contamination between the various varnish types, the machine 1 will first execute an automated self-cleaning process, as will hereafter be described.

Figure 6A:
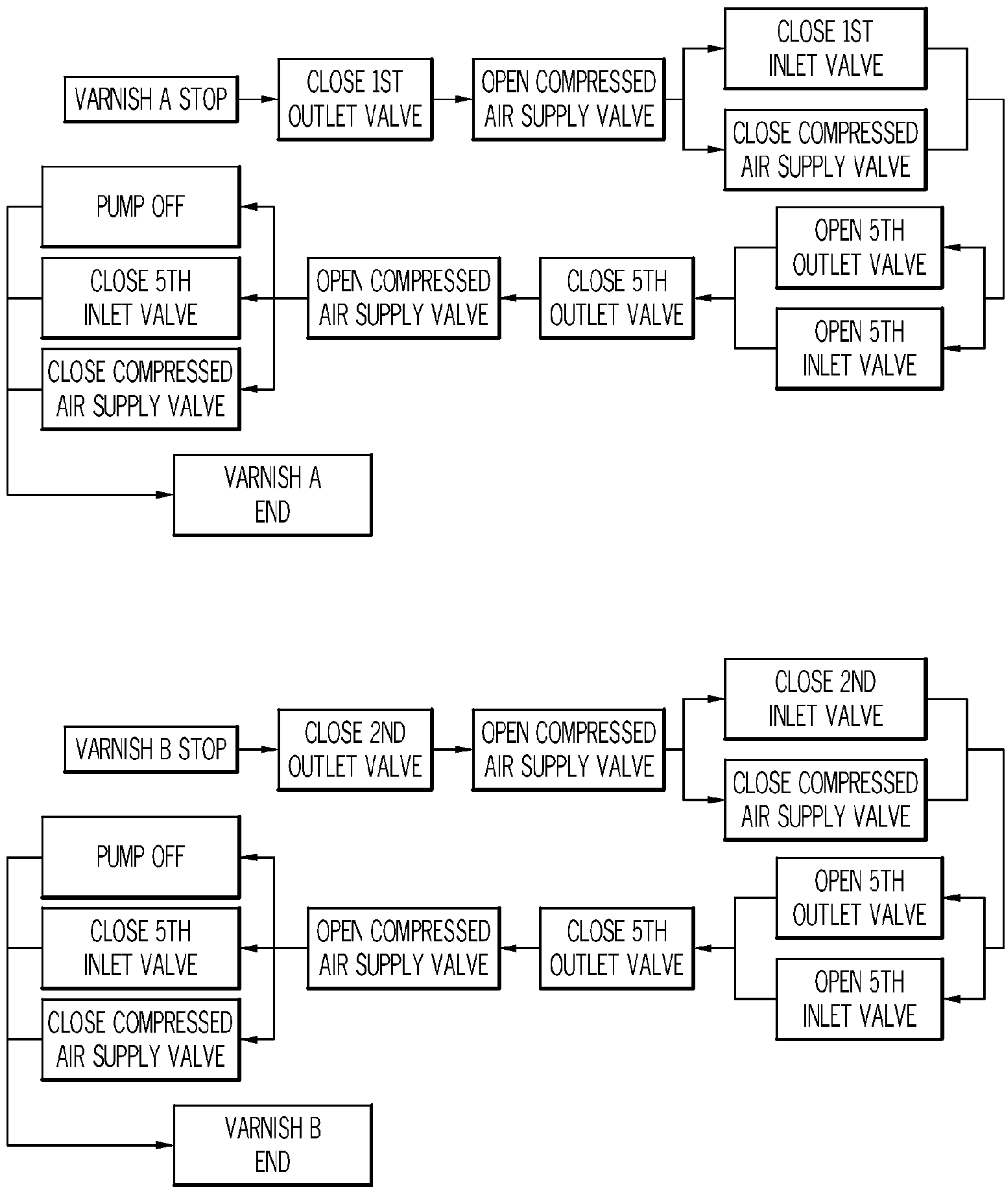
FIGS. 6A and 6B show a control flow chart depicting the use of the exemplary embodiment of the present invention shown in FIG. 1 to execute an automated self-cleaning process.

Referring now to FIGS. 1 and 6A and B, with particular attention being directed to the control flow chart shown in FIGS. 6A and 6B, the automated self-cleaning process will now be explained. The machine 1 will continue to supply Type A varnish until the operator presses a stop button on the user interface 140. Pressing the stop button on the user interface 140 initiates the automated self-cleaning process, and a signal is sent to the control mechanism 130 instructing the control mechanism 130 to close the first outlet valve 11. Closing the first outlet valve 11 prevents any more Type A varnish from entering into the supply line 60. The control mechanism 130 opens the compressed air supply valve 101 two seconds after the first outlet valve 11 is closed. This allows compressed air from the first compressed air supply 100 to enter into the supply line 60. The compressed air assists the pump 80 in evacuating a majority of the Type A varnish from the varnishing system 500. Together, the compressed air and the pump 80 force the Type A varnish out of supply line 60, through the pump 80, out of the varnish application device 180, and back into the first cylindrical storage container 10 via the first inlet valve 12.

The control mechanism 130 simultaneously closes the first inlet valve 12 and the compressed air valve 101 two hundred seconds after opening the compressed air supply valve 101. This prevents compressed air from the compressed air supply 100 from entering into the supply line 60, and also prevents Type A varnish from backflowing out of the first storage container 10 through the first inlet valve 12 and into the return line 70. While the compressed air from the compressed air supply 100 and the pump 80 have cooperated to successfully evacuate a majority of the Type A varnish from the system 500, there still exists a probability that a residual amount of Type A varnish remains within the system 500. As will hereafter be described, water from the fifth storage container 50 is used to remove any of this residual Type A varnish from the system 500.

The fifth outlet valve 51 and the fifth inlet valve 52 are simultaneously opened by the control mechanism 130 two seconds after the first compressed air supply valve 101 and the first inlet valve 12 are closed. Because the pump 80 has been continuously operating since the operator initially requested a supply of Type A varnish, opening the fifth outlet valve 51 allows the pump 80 to draw fresh water out of the fifth storage container 50 through the fifth outlet valve 51 and into the supply line 60 towards the pump 80. The water travels through the pump 80 and is supplied to the varnish application device 180. After exiting the varnish application device 180 the water is recirculated back into the machine 1 through the return line 70 and into the fifth storage container 50 via the fifth inlet valve 52. This process of circulating water through the system 500 continues for two hundred seconds, at which point the fifth outlet valve 51 is closed by the control mechanism 130. Circulating water for two hundred seconds through the varnishing system 500 ensures that all remaining residual traces of the Type A varnish within the system 500 have been eliminated. This thorough cleansing of the varnishing system 500 ensures that the separate varnish types contained within the machine 1 do not contaminate one another.

Closing the fifth outlet valve 51 prevents any more water from entering the supply line 60. The control mechanism 130 then opens the first compressed air supply valve 101 two hundred seconds after the fifth outlet valve 51 is closed. Opening the first compressed air supply valve 101 allows compressed air from the compressed air supply 100 to enter into the supply line 60. The compressed air and the pump 80 cooperate with one another to force the water out of the supply line 60, through the pump 80, out of the varnish application device 180 and back into the fifth storage container 50 via the fifth inlet valve 52. Because the fifth outlet valve 51 is closed, thereby preventing any additional water from entering into the system 500, the combination of the pump 80 and the effects of the compressed air effectively evacuate the water from the varnishing system 500 and force the cleaning water back into storage in the fifth storage container 50. Ensuring that all the water has been evacuated from the system 500 is especially important, as it ensures that the water used to clean the system 500 does not dilute the varnishes stored by the machine 1.

Compressed air from the compressed air supply 100 and the pump 80 continue to operate in unison for two hundred seconds, at which point the compressed air supply valve 101 and the fifth inlet valve 52 are simultaneously closed. Closing the compressed air supply valve 101 prevents compressed air from entering into the supply line 60, while closing the fifth inlet valve 52 prevents water from backflowing out of the fifth storage container 50 and into the return line 70. The pump 80 is simultaneously shut down with the closing of the first compressed air supply valve 100 and the fifth inlet valve 52, thereby completing the automated self-cleaning process.

Figure 6B:
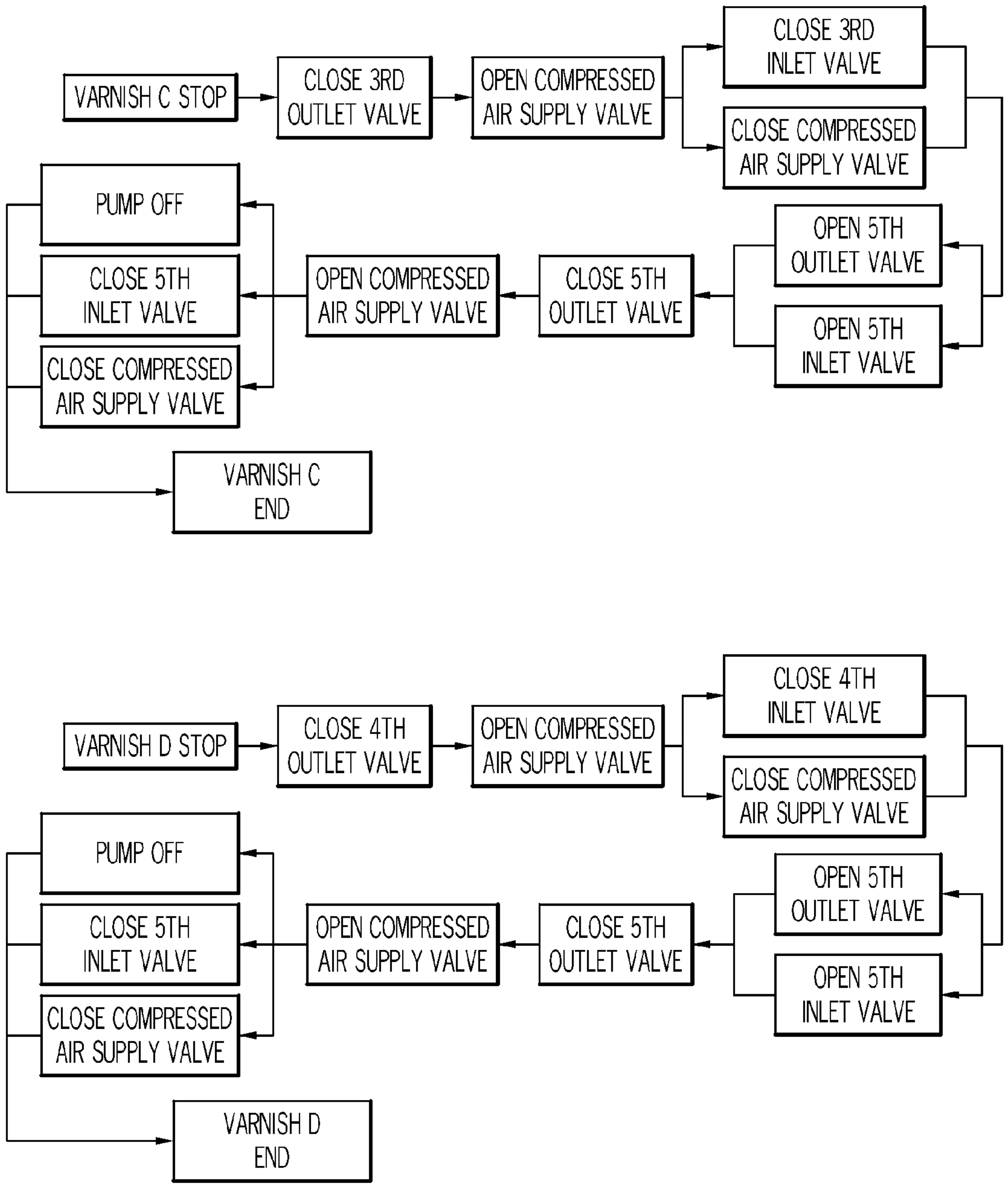

As can be seen in the control flow chart shown in FIGS. 6A and 6B, the automated self-cleaning process described above is exactly the same regardless of which type of varnish the machine 1 is supplying, except that the control mechanism 130 will close the appropriate valves corresponding to the type of varnish being supplied. For example, if the machine had been supplying Type D varnish before entering into the automated self-cleaning process, the control mechanism 130 would, instead of closing the first outlet valve 11 and the first inlet valve 12 as has been described in detail above, close the fourth outlet valve 41 and the fourth inlet valve 42 at the appropriate times.

Figure 7:
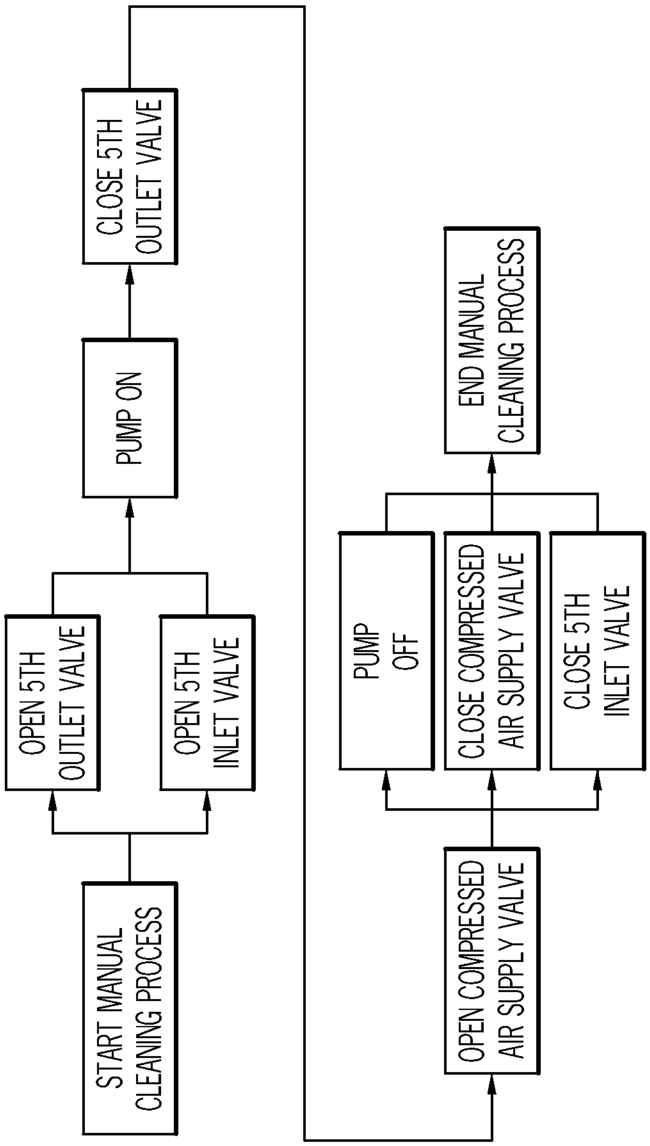
FIG. 7 is a control flow chart depicting the use of the exemplary embodiment of the present invention shown in FIG. 1 to execute a manual self-cleaning process.

Referring now to FIGS. 1 and 7, with particular attention being directed towards the control flow chart shown in FIG. 7, the manual self-cleaning process will now be explained. To execute the manual self-cleaning process, the operator depresses the manual self-cleaning start button on the user interface 140. This results in a signal being sent from the user interface 140 to the control mechanism 130 that instructs the control mechanism 130 to simultaneously open the fifth outlet valve 51 and the fifth inlet valve 52. Opening the fifth outlet valve 51 allows water to flow into the supply line 60. The pump 80 is activated two seconds after the fifth outlet valve 51 and the fifth inlet valve 52 are simultaneously opened. The pump 80 circulates the water through the supply line 60, the pump 80, the varnish application device 180, the return line 70, and through the fifth inlet valve 52 back into the fifth storage container 50.

The manual self-cleaning process is not provided with a predetermined time period regarding the duration of the circulation of water. Accordingly, the machine 1 will continue to circulate water through the varnishing system 500 until the operator depresses the manual self-cleaning stop button on the user interface 140. Depression of the manual self-cleaning stop button causes a signal to be sent from the user interface 140 to the control mechanism 130 that instructs the control mechanism 130 to close the fifth outlet valve 51. At this point, the machine 1 concludes the manual self-cleaning process in the same way that the above-described automated self-cleaning process is finalized. Closing the fifth outlet valve 51 prevents any more cleaning water from entering into the system 500. Two seconds after the fifth outlet valve 51 is closed, the control mechanism opens the compressed air supply valve 101, allowing compressed air from the compressed air supply 100 to enter into the supply line 60. The compressed air and the pump 80 cooperate with one another to evacuate the water from the varnishing system 500 and force the water back into the fifth storage container 50. Simultaneously, after two hundred seconds, the compressed air supply valve 100 is closed, the fifth inlet valve 52 is closed, and the pump 80 is shut down, effectively completing the manual self-cleaning process.

Referring now to FIG. 4 the operation of the alternative embodiment of the varnish supply machine 200 will now be explained. Before the operation of the machine 200 can begin, the operator must ensure that each of the storage containers 10, 20, 30, 40, 50 is filled with the appropriate liquid, and that the level of the liquids is adequate. Again, for the purposes of this disclosure, it will be assumed that first, second, third, and fourth storage containers 10, 20, 30, 40 are filled with different types of varnish (Type A, Type B, Type C, and Type D, respectively), while the fifth storage container 50 is filled with water.

Referring now to FIGS. 4 and 5, with particular attention being directed to the control flow chart shown in FIG. 5, the supply of varnish to the varnish application device 180, the operation of the alternative embodiment of the varnish supply machine 200 is identical to the operation of the exemplary embodiment of the varnish supply machine 1.

To instruct the alternative embodiment of the varnish supply machine 200 to supply Type A varnish, the operator depresses the corresponding Type A varnish button on the user interface 140. This causes the modified control mechanism 131 to simultaneously open the first outlet valve 11 and the first inlet valve 12. Two seconds later, the pump 80 is activated, forcing Type A varnish to flow out of the first outlet valve 11 and though the supply line 60. The pump 80 circulates the Type A varnish to the varnish application device 180. Excess Type A varnish is recirculated back into the machine 1 through the return line 70 and into the first storage container 10 via the first inlet valve 12.

The alternative embodiment of the varnish supply machine 200 will continue to supply Type A varnish until the operator initiates the automated self-cleaning process by depressing the stop button on the user interface 140.

Figure 8A:
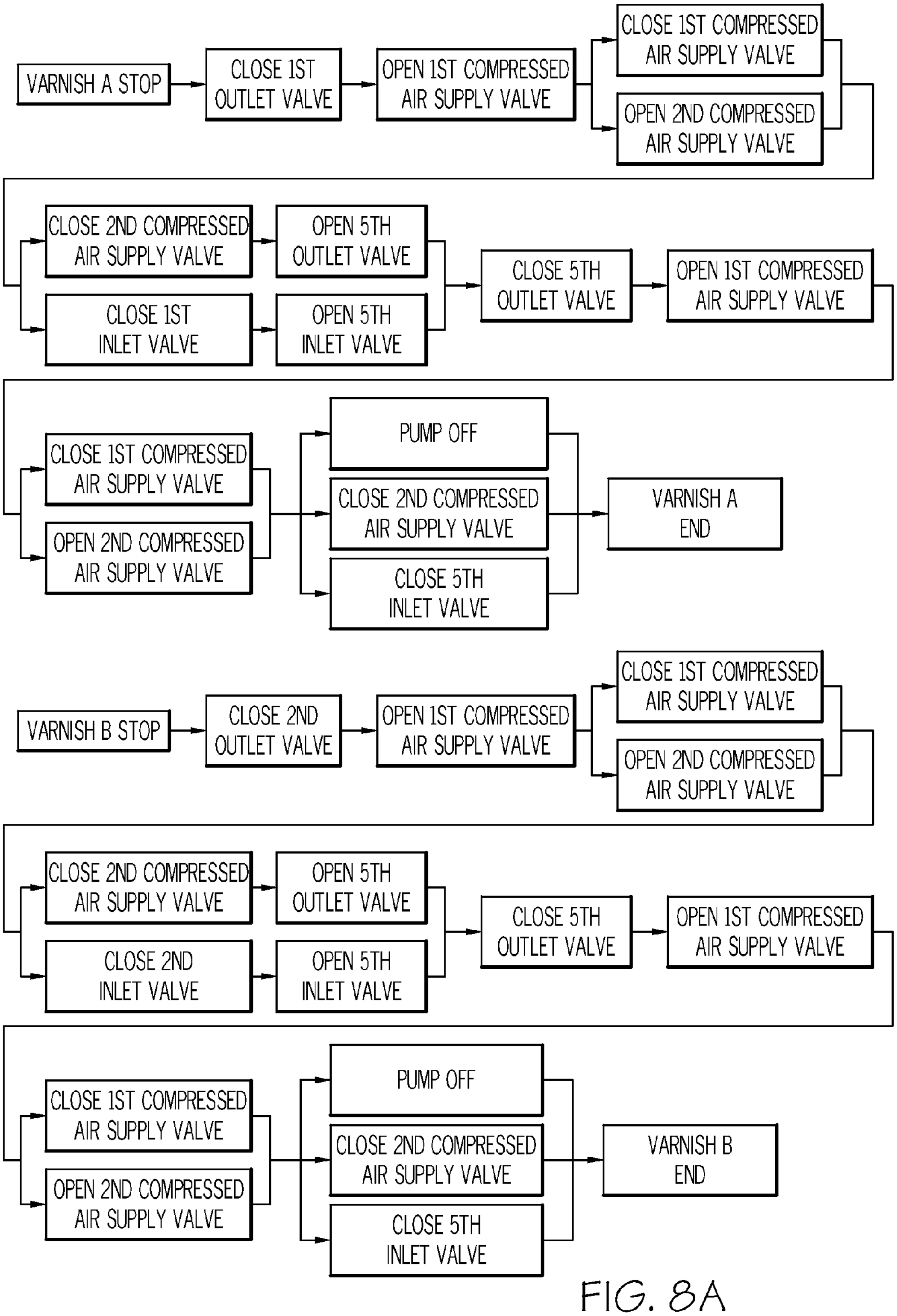
FIGS. 8A and 8B show a control flow chart depicting the use of the alternative embodiment of the present invention shown in FIG. 4 to execute an automated self-cleaning process.
Figure 8B:
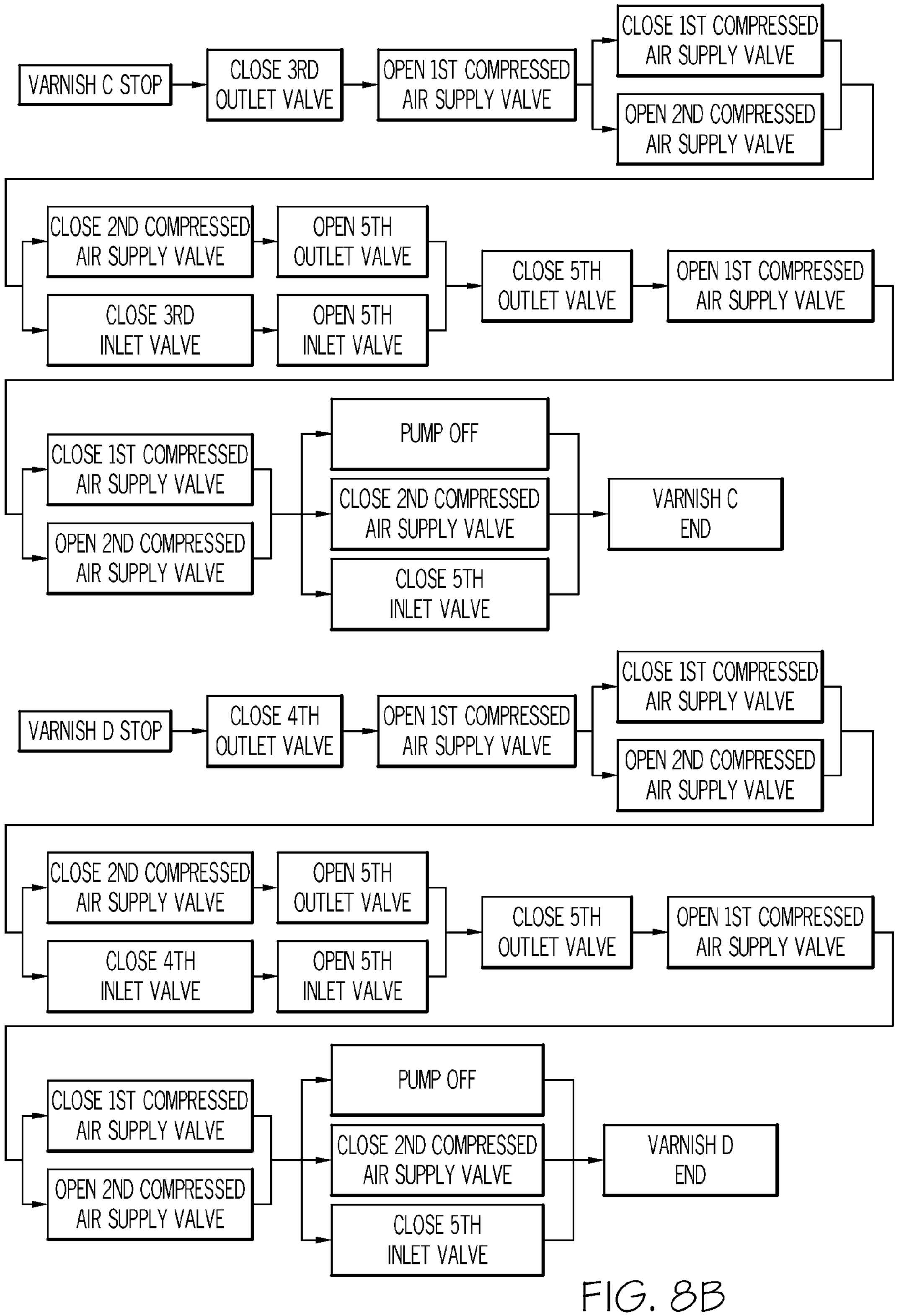

Referring now to FIGS. 4 and 8A and 8B, with particular attention being directed toward the control flow chart shown in FIGS. 8A and 8B, the automated self-cleaning process of the alternative embodiment of the machine 200 will now be explained. The beginning stages of the automated self-cleaning process for the alternative embodiment of the varnish supply machine 200 are identical to the beginning states of the automated self-cleaning process for the exemplary embodiment of the varnish supply machine 1. Depression of the stop button causes the modified control mechanism 131 to close the first outlet valve 11. Two seconds later, the modified control mechanism 131 opens the compressed air supply valve 101. Compressed air from the compressed air supply 100 enters into the supply line 60 and assists the pump in forcing the Type A varnish out of circulation from the system 500 and back into the first storage container 10.

The first compressed air supply valve 101 is allowed to remain open for two hundred seconds, at which point the modified control mechanism 131 closes the first air compressed supply valve 101 while simultaneously opening the second compressed air supply valve 111. Opening the second compressed air supply valve 111 allows compressed air from the second compressed air supply 110 to enter into the return line 70.

While compressed air from the first compressed air supply 100 does circulate through the return line 70 while the first compressed air supply valve 101 is open, the close proximity of the second compressed air supply 110 to the return line 70 allows for a greater percentage of Type A varnish to be removed from circulation and out of the system 500 before water is circulated through the system 500 by the machine 200.

The modified control mechanism 131 simultaneously closes the second compressed air supply valve 111 and the first inlet valve 12 two hundred seconds after opening the second compressed air supply valve 111. Two seconds later, the modified control mechanism 131 simultaneously opens the fifth outlet valve 51 and the fifth inlet valve 52, thereby allowing water to circulate through the system 500. The pump 80, which has been continuously operating since the operator requested Type A varnish, draws water out of the fifth storage container 50 through the fifth outlet valve 51 and into the supply line 60. The water flows through the supply line 60, through the pump 80, and is circulated through the varnish application device 180. The pump 80 then recirculates the water back into the machine 200 via the return line 70. The water travels down the return line 70, through the fifth inlet valve 53 and back into the fifth storage container 50. The fifth outlet valve 52 is closed by the modified control mechanism 131 after the machine 200 has circulated water through the system 500 for two hundred seconds. Two seconds later, the modified control mechanism 131 opens the first compressed air supply valve 101, thereby allowing compressed air to enter into the supply line 60. Together, the compressed air from the first compressed air supply 100 and the pump 80 force the cleaning water out of circulation from the system 500 and back into the fifth storage container 50.

Compressed air from the first compressed air supply 100 is allowed to enter into the supply line 60 for two hundred seconds, at which point the modified control mechanism 131 closes the first compressed air supply valve 101 and simultaneously opens the second compressed air supply valve 111. This allows compressed air from the second compressed air supply source 110 to enter into the return line 70. As noted above, the close proximity of the second compressed air supply 110 to the return line 70 results in a greater quantity of fluid being removed from the system 500. The pump 80 operates in unison with compressed air from the second compressed air supply 110 for two hundred seconds to further evacuate water from system 500. The automated self-cleaning process is completed when, after two hundred seconds, the modified control mechanism 131 simultaneously closes the second compressed air supply valve 111 and the fifth inlet valve 52, and the pump 80 is shut down.

Similar to the exemplary embodiment of the self-cleaning varnish supply machine 1, the automated self-cleaning process of the alternative embodiment of the self-cleaning varnish supply machine 200 is identical regardless of which type of varnish was being supplied before the automated self-cleaning process was initiated, as can be seen in the control flow chart shown in FIGS. 8A and 8B. However, as explained in detail above, the machine will not always close the first outlet valve 11 and the first inlet vale 12, but rather will close the appropriate pair of valves, which is dependent on what type of varnish was being supplied before the automated self-cleaning process was initiated.

Figure 9:
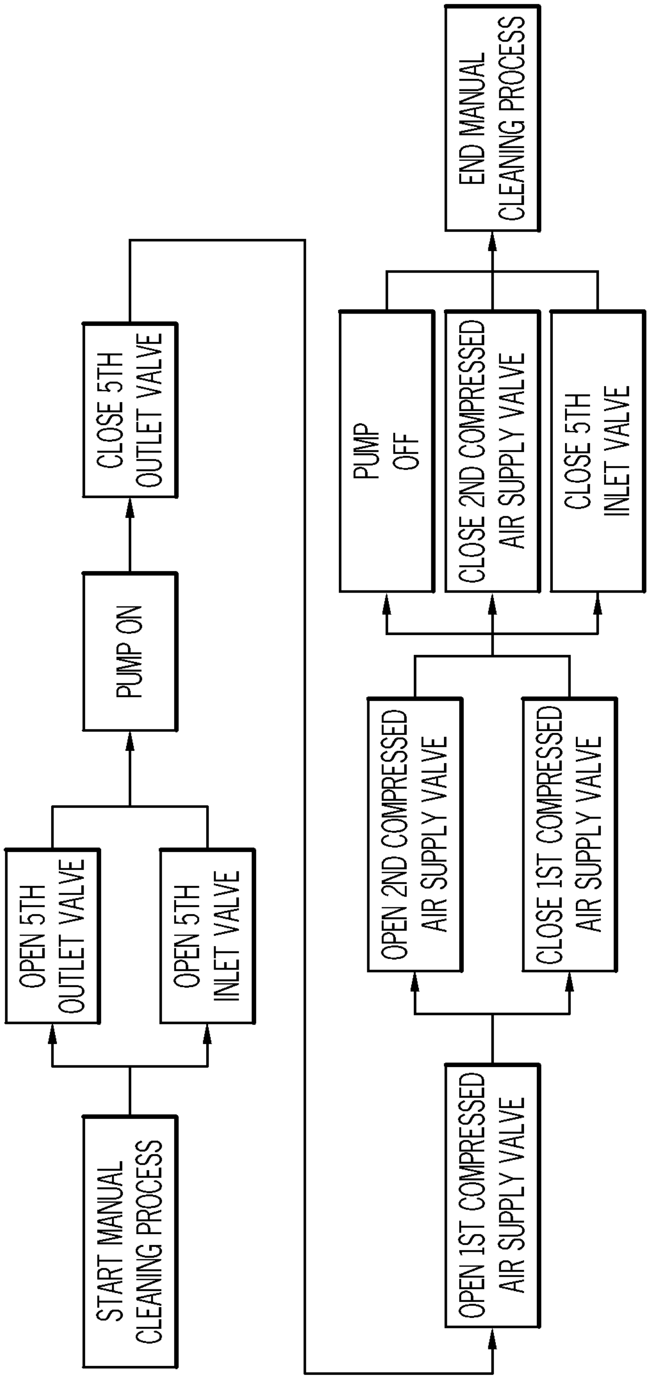
FIG. 9 is a control flow chart depicting the use of the alternative embodiment of the present invention shown in FIG. 4 to execute a manual self-cleaning process.

Referring now to FIGS. 4 and 9, with particular attention being directed to the control flow chart shown in FIG. 9, the manual self-cleaning process of the alternative embodiment of the varnish supply machine 200 will now be explained. This process begins with the operator depressing the manual self-cleaning start button on the user interface 140. This causes the modified control mechanism 131 to simultaneously open the fifth outlet valve 51 and the fifth inlet valve 52. Two seconds later, the pump 80 is activated. The pump 80 circulates water through the system 500 for two hundred seconds. The duration of the pump 80 circulating water through the system 500 is not timed. Accordingly, the machine 200 will continue to pump water through the system 500 until the operator depresses the stop manual cleaning process button. This results in the modified control mechanism 131 closing the fifth outlet valve 51. Two seconds later, the modified control mechanism 131 opens the first compressed air supply valve 101. Compressed air from the first compressed air supply 100 enters into the system 500 through the supply line 60 and assists the pump 80 in forcing water out of the system 500 and back into the fifth storage container 50. The first compressed air supply valve 101 is closed after two hundred seconds, and simultaneously the second compressed air supply valve 111 is opened. Compressed air from the second compressed air supply 110 rushes into the system 500 through the return line 70, and further assists in forcing water back into the fifth storage container 50. Two hundred seconds after the second compressed air supply valve 111 is open, the modified control mechanism 131 simultaneously closes the second compressed air supply valve 111 and the fifth inlet valve 52. Additionally, the pump 80 is shut off, thereby completing the manual self-cleaning process.

It will thus be seen that a novel machine for supplying varnish been disclosed. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

What is claimed is:

1. A self-cleaning varnish supply machine, the machine having a proximal end, a distal end, a near side, and a far side, the machine comprising:

a frame;

a storage container receptacle mounted on the frame;

a plurality of cylindrical storage containers disposed within the storage container receptacle;

a pump located at the distal end of the machine;

a supply line running along the far side of the machine, the supply line running from the proximal end of the machine to distal end of the machine, positioned under the storage container receptacle and connected to the pump at the distal end of the machine;

a return line running along the near side of the machine, the return line running from the proximal end of the machine to the distal end of the machine and connected to the pump at the distal end of the machine;

a plurality of outlet valves connecting the plurality of cylindrical storage containers to the supply line;

a plurality of inlet valves connecting the plurality of cylindrical storage containers to the return line;

a first compressed air supply located at the proximal end of the machine;

a first compressed air supply valve connecting the first compressed air supply to the supply line at the proximal end of the machine;

a control mechanism for controlling the plurality of outlet valves, the plurality of inlet valves, and the first compressed air supply valve; and a user interface for controlling the self-cleaning varnish supply machine.

2. The self-cleaning varnish supply machine as defined in claim 1, wherein the machine has a discharge basin mounted on the frame below the storage container receptacle.

3. The self-cleaning varnish supply machine as defined in claim 2, wherein the machine has a plurality of manual valves connected to the plurality of cylindrical storage containers, the plurality of manual valves extending from the bottom of the storage container receptacle and towards the discharge basin.

4. The self-cleaning varnish supply machine as defined in claim 1, wherein the machine has a second compressed air supply located at the distal end of the machine and connected to the return line by a second compressed air supply valve.

5. The self-cleaning varnish supply machine as defined in claim 4, wherein the control mechanism controls the plurality of outlet valves, the plurality of inlet valves, the first compressed air supply valve, and the second compressed air supply valve.

6. The self-cleaning varnish supply machine as defined in claim 5, wherein the machine has a discharge basin mounted on the frame below the storage container receptacle.

7. The self-cleaning varnish supply machine as defined in claim 6, wherein the machine has a plurality of manual valves connected to the plurality of cylindrical storage containers, the plurality of manual valves extending from the bottom of the storage container receptacle and towards the discharge basin.

* * * * *